S. W. PUTNAM, 3D.
METAL TURNING LATHE.
APPLICATION FILED MAY 15, 1912.
1,042,268.
Patented Oct. 22, 1912.
3 SHEETS—SHEET 2.
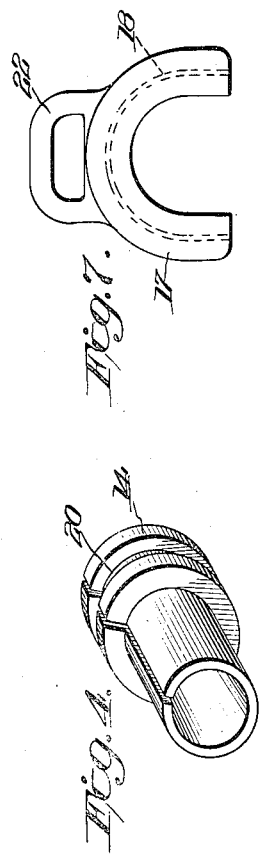
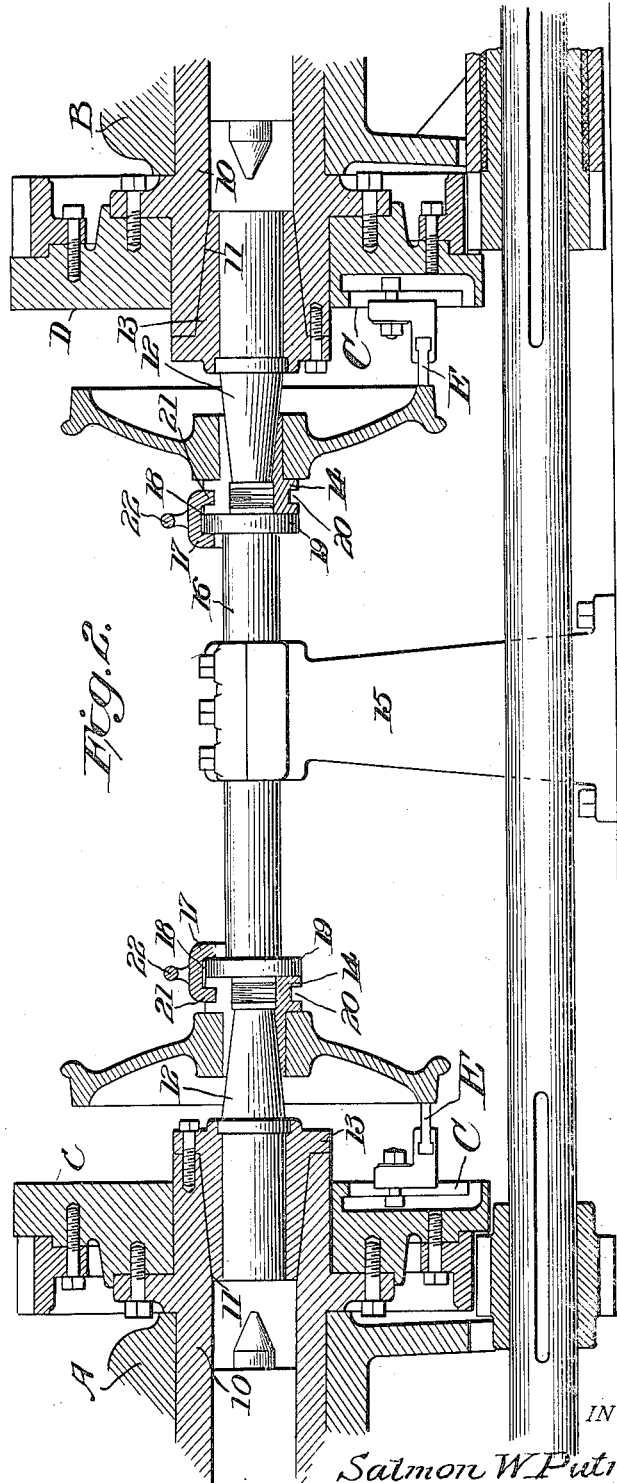
WITNESSES
G. Manning
M. McLathman
INVENTOR
Salmon W. Putnam 3d
By T. Walter Fowler, Attorney

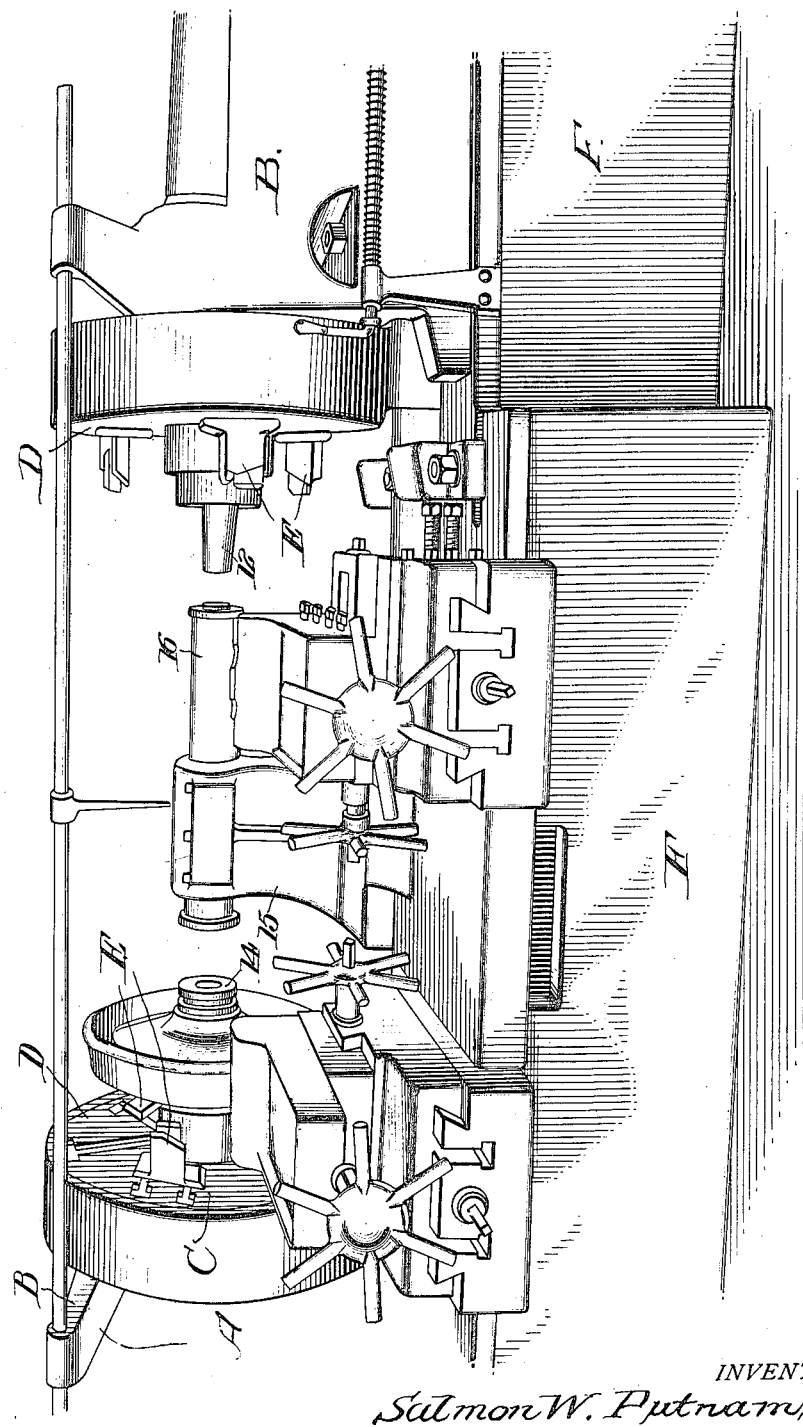

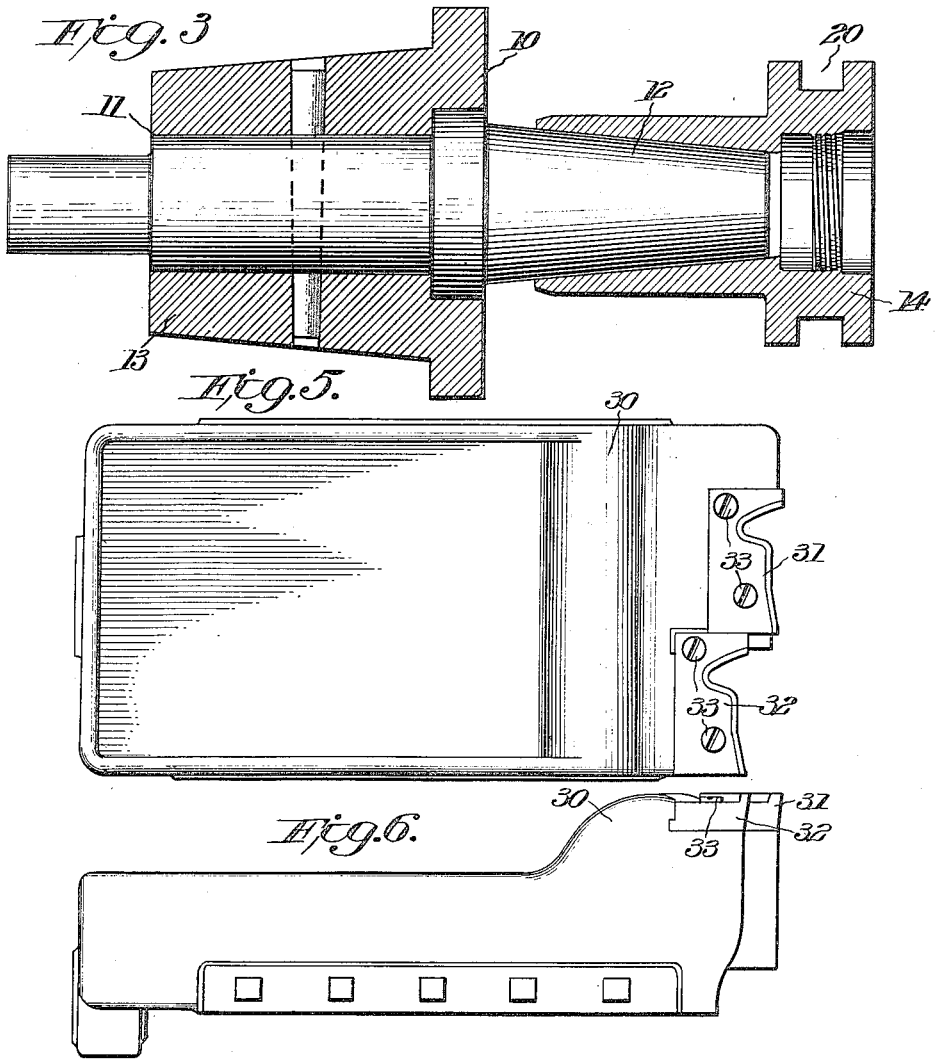

UNITED STATES PATENT OFFICE.

SALMON WILDER PUTNAM, 3D, OF FITCHBURG, MASSACHUSETTS.

METAL-TURNING LATHE.

1,042,268.  Specification of Letters Patent.   Patented Oct. 22, 1912.

Application filed May 15, 1912. Serial No. 697,435.

*To all whom it may concern:*

Be it known that I, SALMON W. PUT-NAM, 3d, a citizen of the United States, residing at Fitchburg, in the county of Worcester and State of Massachusetts, have invented certain new and useful Improvements in Metal-Turning Lathes, of which the following is a specification.

This invention relates to certain new and useful improvements in lathes designed particularly for machining unmounted car wheels, the invention being of such a nature that it may be readily applied to the existing metal turning lathes known as double driving wheel, coach and truck wheel and steel tire turning lathes without any departure from the spirit of the invention.

As is well known, the various types of wheels in all classes of railroading are made by the different wheel manufacturers and sold to the consumer in an unmounted condition; that is, individually and not mounted on or pressed on the usual axles. In the manufacture of these wheels, whether the same are steel castings or rolled, stamped or spun forgings, it has become apparent that the treads of such wheels must be finished true before they are acceptable to the consumer, and various methods including grinding have been tried out all of which are relatively slow and do not produce a sufficient number of wheels per day to make these processes commercially cheap.

In the metal turning lathe designed particularly for turning car wheels, there are usually three conditions to be met, namely;—(1) Turning the tires of wheels which are mounted upon axles and which have external journals upon the axles. (2) Turning the tires upon wheels which are mounted upon axles and have internal journals or journals located between the wheels. (3) Turning the tires upon wheels which are in an unmounted position or not mounted upon an axle.

My present improvement relates particularly to this last mentioned condition, namely, to the machining of unmounted car wheels.

The first and second of the conditions hereinbefore mentioned are satisfactorily met by the existing several forms of driving wheel lathes, coach and truck wheel lathes and steel tire turning lathes, but the third condition referred to, is a new one and one that is just becoming apparent and has not yet received, as far as I am aware, any great amount of consideration from lathe manufacturers, and yet this third condition, namely, the proper turning of tires upon wheels which are in an unmounted condition and not mounted upon an axle is a very important one and opens up an entirely new market for a machine suitably adapted for the intended purpose.

The essential object of my invention is, therefore, the construction of a lathe that will be capable of handling two wheels simultaneously and without mounting the same upon an axle prior to placing in the machine, whether this object be attained by the provision of an entirely new lathe or the conversion of the present driving wheel lathes, coach and wheel truck lathes and steel tire turning lathes into machines which will be capable of handling the two unmounted wheels simultaneously and without mounting said wheels upon an axle prior to placing them in the machine.

With the above and other objects in view, my invention consists of the parts, and the constructions, arrangements and combinations of parts which I will hereinafter describe and claim.

Heretofore the practice recognized by railroads was to use a wheel having either a cast iron or cast steel center upon the periphery of which by suitable means was placed a steel tire adapted to be put into operation and after wearing a certain amount, these tires were turned and trued up in lathes of the class before mentioned without removing the tires from the wheel centers, or the wheel centers with tires thereon from the axle having the same mounted thereon. After truing up the wheels were again put into service and these operations were repeated until the tires were worn out at which time new steel tires were placed upon the wheel centers. This statement has reference particularly to cars adapted to passenger service while freight cars have been supplied with the well known chilled cast iron wheel which is unmachinable.

To obtain greater safety of operation, the railroads have been experimenting with various forms of wheels, as made by different wheel manufacturers with the result that for passenger work it has developed that a solid steel wheel, forged, stamped, or spun is rapidly being adopted and a steel cast wheel for freight service is being adopted by practically all railroads. It has, however, become evident that in the manufacture of these solid wheels, whether forged, stamped, spun or steel castings, that the process of manufacture of the same leaves the treads of the wheels in a rather rough condition, and on this account it has become apparent that the treads of such wheels must be machined without mounting the wheels on axles before they are acceptable to the railroads. It is to meet this condition that I have designed the present improvements while at the same time I am enabled to apply the improvement to the existing lathes of the types before alluded to and thereby convert the present commercial lathes used for turning the tires on mounted wheels to meet the special condition of turning the tires of wheels which are in an unmounted position or not mounted upon an axle.

In the accompanying drawings forming a part of this specification and in which similar reference characters indicate like parts in the several views; Figure 1 illustrates a perspective view of the central portion of a lathe embodying my invention. Fig. 2 is a vertical longitudinal sectional view of the same showing two unmounted wheels in position for turning. Fig. 3 is a detail showing one of my improved sustaining elements or centers with its split bushing and showing a tapered plug by which the sustaining element or center may be fitted to a hollow lathe spindle. Fig. 4 is a perspective view of the split bushing detached. Fig. 5 is a top plan view of a pair of cutters. Fig. 6 is a side elevation of the same. Fig. 7 is a view of one of the yokes, 17.

Machines of the type hereinbefore referred to include as a necessary part of their construction a headstock and a tailstock, these being substantially alike and being located at opposite ends of the machine. A portion of the headstock, A, and of the tailstock, B, is shown in Fig. 1, said headstock being provided with a face-plate, C, of any well known and appropriate construction and the tailstock being likewise provided with a face-plate, D, each of the face-plates being provided with some well known and appropriate form of holding dog, E, adapted to grip or hold the work to be turned. The headstock is usually fastened to and is rigid with the base or bed, F, of the machine and the tailstock is designed to have a longitudinal movement along the bed or base toward and from the headstock, and it is adapted to be clamped to the bed or base member at any desired point. I do not show the details of the headstock and tailstock as these form no part of my present invention, but it will be understood that these two parts of the machine will be supplied with the usual gearing and other accessories, which are common and well known to the headstock and tailstock of the metal turning lathes of the type herein mentioned. It may be said, however, that the headstock and tailstock of the machines of the character before mentioned are usually provided with hollow spindles, 10, which are usually formed with a tapering bore adapted to receive correspondingly tapered plugs or other parts.

In the present drawings I have shown my improvements as applied to the type of lathe having the internal spindle with its tapering bore, to show how readily the existing lathe can be converted into one which is capable of machining unmounted car wheels, but it will be understood that my invention is not limited in any manner to this particular type of lathe or in fact to any lathe which requires or usually employs the hollow spindle having the tapering bore, since all that is required, broadly speaking, is that the sustaining centers or elements which I use in my improvement shall be rigidly fixed to the lathe spindle and shall project sufficiently beyond the face-plate of the headstock and tailstock to enable the unmounted wheel to be suitably positioned, as I will now indicate.

Referring to Figs. 2 and 3, it will be seen that in order to adapt the existing and standard lathes designed for turning wheels, to meet the special requirements for the unmounted wheel condition before mentioned, I have a construction by which I am enabled to insert into the tapered bore, 11, of the hollow spindle, 10, the special sustaining element or center, 12, shown in Fig. 3, and by the employment of this sustaining element, one for the headstock and another for the tailstock, and an intermediate mandrel, I am enabled to convert the present commercial lathe into one which will meet the special conditions for unmounted wheels. To this end the sustaining element or center may be provided with a taper plug, 13, which is readily adapted for insertion into the tapered bore of the hollow spindle before mentioned, said element projecting from the face of the plug for a suitable distance, as shown.

In assembling the parts a suitable bushing, 14, one preferably of the split type shown in Fig. 4, is inserted into the wheel to be turned and the wheel and bushing then placed on the projecting tapering portion of the sustaining element or center, as shown in Fig. 2, there being, of course, a sustaining element or center projecting beyond the face-plate of the headstock and a corresponding sustaining element or center projecting beyond the face-plate of the tailstock, and each of these elements receiving the split bushing of a wheel to be turned, the two sustaining elements or centers being directly in line with each other.

It will be observed from Figs. 1 and 2, that the present improvements further include a standard or support, 15, which is fixed to the bed of the machine at a point between the headstock and tailstock which standard serves as a support for a mandrel or dummy axle, 16, said mandrel being axially alined with the centers or sustaining elements, 12, on the headstock and tailstock and being free to rotate in the support or bearing and to move longitudinally therein as desired.

From the foregoing description it will be understood that when the tailstock has been run back away from the headstock a sufficient distance and a pair of wheels previously bored and supplied with the split bushings, 14, is, by the employment of cranes or other means swung into position and placed on the projecting taper portions of the sustaining elements or centers, 12, one on the headstock and one on the tailstock, the tailstock may by the employment of the mechanism which it usually contains, be moved along the bed or base of the machine toward the headstock and until the split taper bushings will be suitably expanded against the bore of the wheel, by being forced onto the taper portions of the sustaining elements or centers. This having been done the tailstock is suitably clamped to the bed. The wheels having been turned and it now being desired to remove them from the machine, I call into play certain yokes, 17, which are used to assist in withdrawing the wheels from the sustaining elements. These yokes are put into position as shown in Fig. 2, and they may have the detailed construction shown in Fig. 8, so that when the tailstock moves away from the headstock, the yokes, which are carried by the mandrel, 16, will pull the wheels and split taper bushings off of the taper portions of the sustaining elements or centers, 12, when the wheels may be readily removed in the usual manner and another pair of wheels inserted for machining. The yokes have internal channels, 18, which are adapted to receive suitable collars, 19, on the ends of the mandrel, and the said bushings have annular channels or grooves, 20, in which engage an inwardly turned flange, 21, on the yoke, the yokes being curved on the upper sides to enable them to fit over the collars on the mandrel and each yoke being made as a single steel casting with a hand-hold, 22, or other portion to facilitate its application to and removal from the mandrel and split bushing.

Referring again to Fig. 2, where the wheels are in position, it will be understood that the edges of these wheels are suitably engaged with the drivers or dogs, E, on the face-plates of the head and tailstocks, and when so engaged by the dogs the wheels may be readily turned or machined in the customary manner.

For the purpose of increasing the daily production of such a lathe as has hereinbefore been described, I employ an improved form of tool block construction shown particularly in Figs. 5 and 6, and by reference to these figures, it will be seen that the tool slide, 30, is provided with two full width forming tools, 31 and 32, corresponding to the entire contour of the wheel to be machined. I prefer to use two blades on each tool-slide, instead of a single blade fashioned to correspond to the entire contour of the wheel to be machined for the following reasons: First, in the case of a very bad tire condition, I may use one of these tools, 31, as a roughing tool and finish with the other, 32; and second, if the tire condition warrants it to use one blade for both roughing and finishing until it fails, I may then without loss of time change to the other tool by moving the tool slide along until the second tool is in position to cut, the tool which failed being then replaced by another one kept ready for that purpose and the new blade being put in position while the second tool is cutting and without loss of time.

It will be noted in Fig. 5, that one of the blades, 32, is in a slightly retracted position with respect to the other and this is necessary in order for the retracted blade to clear the driving dogs on the face-plates when the tool-slide is moved toward the face-plate for the more protruded tool, 31, to operate. These tools are slidably mounted on the tool block and secured in their adjusted positions by means of suitable screws, 33.

Having thus described my invention what I claim as new and desire to secure by Letters Patent is:—

1. In a lathe, the combination with the head and tailstock thereof and the bed or frame upon which they are mounted, said headstock and tailstock having internal spindles, of a mandrel supported upon the bed of the machine in line with said spindles, and sustaining elements or centers rigid with said spindles and projecting therefrom, said elements adapted to sustain a wheel to be machined, at each end of the mandrel, one adjacent the headstock and the other adjacent the tailstock.

2. In a lathe having a bed or frame, a headstock and a tailstock, and hollow spindles mounted in line within said headstock and tailstock, of means for operatively supporting a pair of wheels in line upon a common axis, said means including sustaining elements or centers projecting beyond the inner faces of the headstock and tailstock and rotating with said spindles and each adapted to support one of said wheels, a mandrel horizontally disposed in line with said elements or centers, and bushings removably fitted to the wheels and adapted to fit over said elements or centers.

3. In a lathe having a bed or frame and a headstock and tailstock at opposite portions thereof, said headstock and tailstock having internal hollow spindles, of sustaining elements or centers projecting beyond the inner faces of the headstock and tailstock and rotating with said spindles and each adapted to support a wheel to be machined, bushings adapted to fit the bores of said wheels and to receive the projecting portions of the sustaining elements or centers, a mandrel horizontally supported in line with the sustaining elements or centers, and means connecting the ends of the mandrel to the bushings to facilitate the removal of the bushings and their attached wheels from the sustaining elements or centers.

4. In a lathe having a bed or frame, and a headstock and tailstock at opposite portions thereof, said headstock and tailstock having internal spindles, of sustaining elements or centers removably fitted to said spindles and projecting beyond the inner faces of the headstock and tailstock, and each adapted to support a wheel to be machined, split bushings adapted to fit the bores of said wheels and to receive the projecting portions of the sustaining elements or centers, a mandrel horizontally supported in line with the sustaining elements or centers and having flanged ends adapted to abut corresponding ends of the bushings, and means connecting the ends of the mandrel to the bushings to facilitate the removal of the bushings and their attached wheels from the sustaining elements or centers, said means comprising yokes fitted to the bushings and the flanged ends of the mandrel.

5. An improved lathe comprising a bed or frame, a headstock, a tailstock, said headstock and tailstock each having a revoluble face-plate provided with work-holding dogs, and internal spindles having sustaining elements or centers, of supplemental means for sustaining a pair of wheels axially in line between the headstock and tailstock and in position to be engaged by said dogs, said means including a support on the bed of the machine, a mandrel slidably mounted in said support and arranged horizontally, bushings adapted to be fitted to the bores of the wheels, means for securing the bushings to the ends of the mandrel, and sustaining elements or centers removably fitted to said spindles and projecting beyond said face-plates and holding dogs and adapted to detachably receive said split bushings.

6. In a lathe having a headstock and a tailstock each with a longitudinal spindle, means for machining a pair of wheels simultaneously, said means comprising sustaining elements rigid with said spindles, split bushings adapted to fit the bores of the wheels to be turned and to be forced over the sustaining elements or centers, and a horizontal longitudinally slidable mandrel in line with said centers or sustaining elements and adapted to endwise abut the split bushings, and means for connecting the mandrel directly to the bushings to facilitate the removal of the bushings from the sustaining elements when the headstock and tailstock are moved one relatively to the other.

7. A lathe having in combination, a pair of opposed sustaining elements or centers arranged axially in line, a horizontal, slidably mounted mandrel in line with said elements or centers, bushings adapted to removably fit the bores of wheels to be machined and to be forced one over each of said elements or centers, said bushings adapted to abut the ends of the mandrel, and means separably connecting the bushings to adjacent ends of the mandrel.

In testimony whereof I affix my signature in presence of two witnesses.

SALMON WILDER PUTNAM, 3d.

Witnesses:
ALFRED C. ANDERSON,
MINAT R. STEWART.